United States Patent [19]

Blessom et al.

[11] 4,374,402
[45] Feb. 15, 1983

[54] PIEZOELECTRIC TRANSDUCER MOUNTING STRUCTURE AND ASSOCIATED TECHNIQUES

[75] Inventors: Norman S. Blessom; Herbert U. Ragle, both of Thousand Oaks; Dean DeMoss, Camarillo, all of Calif.

[73] Assignee: Burroughs Corporation, Detroit, Mich.

[21] Appl. No.: 163,468

[22] Filed: Jun. 27, 1980

[51] Int. Cl.³ .................. G11B 5/48; G11B 5/56; G11B 21/24

[52] U.S. Cl. .................. 360/104; 360/109; 360/76

[58] Field of Search .................. 360/75–78, 360/104–109, 110, 111–113; 310/331, 332

[56] References Cited

U.S. PATENT DOCUMENTS

| | | | |
|---|---|---|---|
| 2,842,685 | 7/1958 | Petermann et al. | 310/331 |
| 3,304,773 | 2/1967 | Rogallo | 310/331 |
| 3,526,726 | 9/1970 | Corbett et al. | 310/331 |
| 3,706,861 | 12/1972 | Giel | 360/75 X |
| 3,748,503 | 7/1973 | Cobarg et al. | 310/331 |
| 3,760,203 | 9/1973 | Guntersdorfer et al. | 310/331 |
| 3,835,338 | 9/1974 | Martin | 310/331 |
| 3,924,268 | 12/1975 | McIntosh et al. | 360/77 |
| 3,936,882 | 2/1976 | Lane | 360/104 |
| 3,994,018 | 11/1976 | Kihara et al. | 360/105 |
| 4,080,636 | 3/1978 | Ravizza | 360/109 X |
| 4,091,428 | 5/1978 | Saito et al. | 360/104 |
| 4,099,211 | 7/1978 | Hathaway | 360/109 |
| 4,106,065 | 8/1978 | Ravizza | 360/109 |
| 4,188,645 | 2/1980 | Ragle | 360/75 |

Primary Examiner—John H. Wolff
Attorney, Agent, or Firm—John J. McCormack; Nathan Cass; Kevin R. Peterson

[57] ABSTRACT

Described is a pair of "compound pz-flexures" mounting, and driving, a magnetic recording transducer for controlled reciprocation, with the flexures under suitable driving voltage, executing "S-bends" during flexure so as to keep transducer reciprocation relatively rectilinear.

9 Claims, 20 Drawing Figures

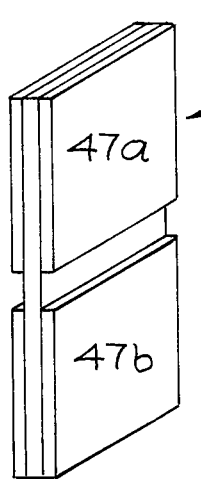 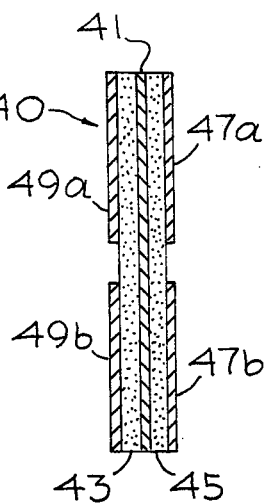 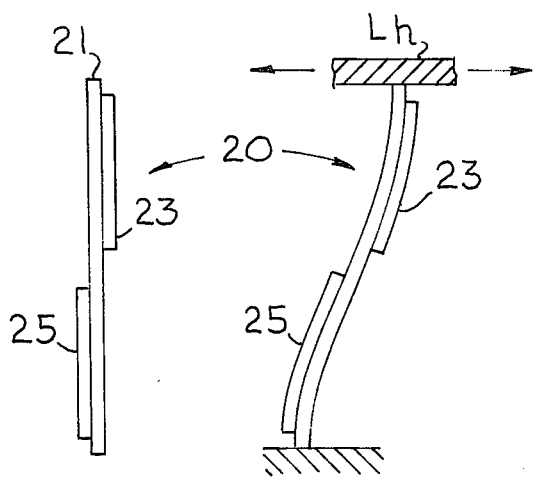
*Fig. 4A*  *Fig. 4B*  *Fig. 6A*  *Fig. 6B*
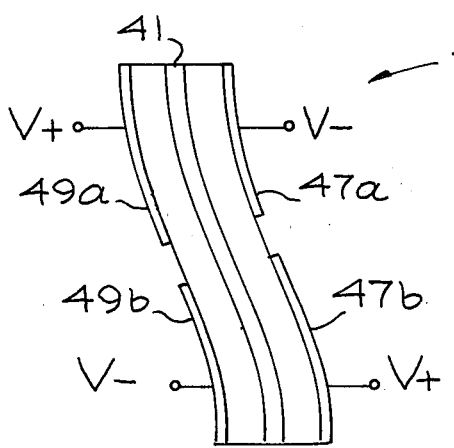 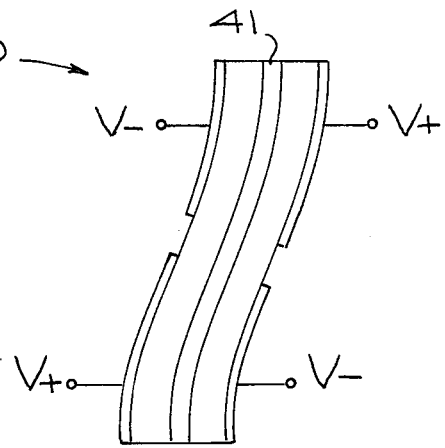
*Fig. 5A*  *Fig. 5B*
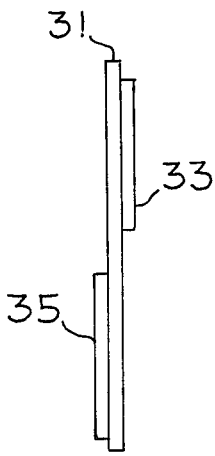 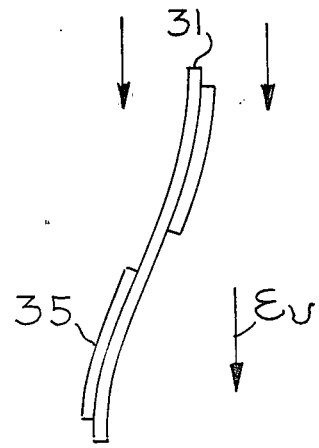 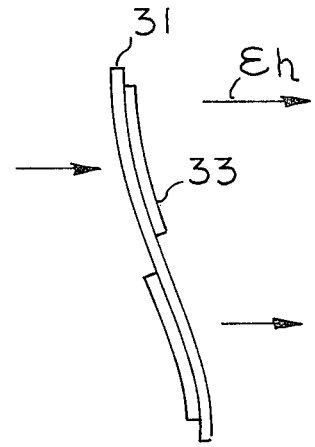
*Fig. 7A*  *Fig. 7B*  *Fig. 7C*

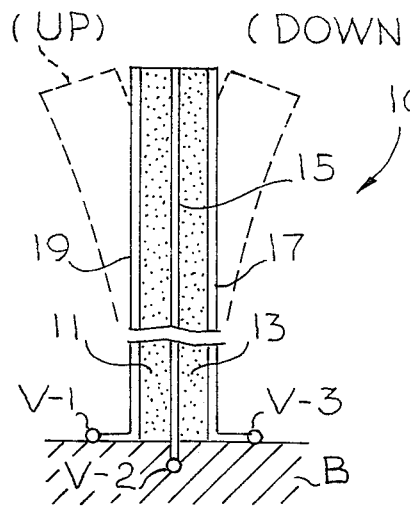
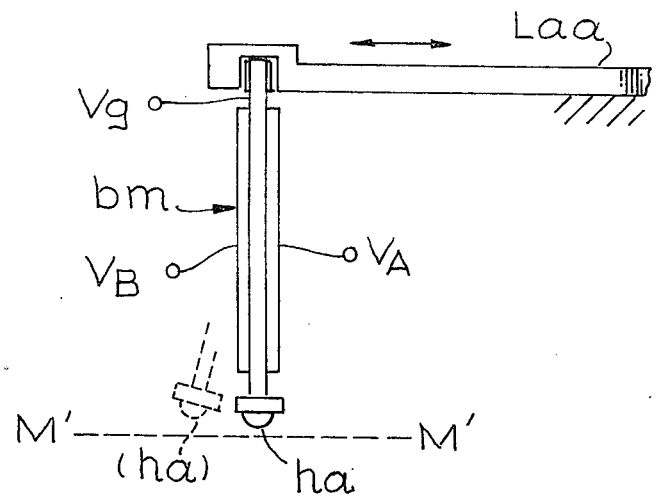
Fig. 8    Fig. 9 (PRIOR ART)
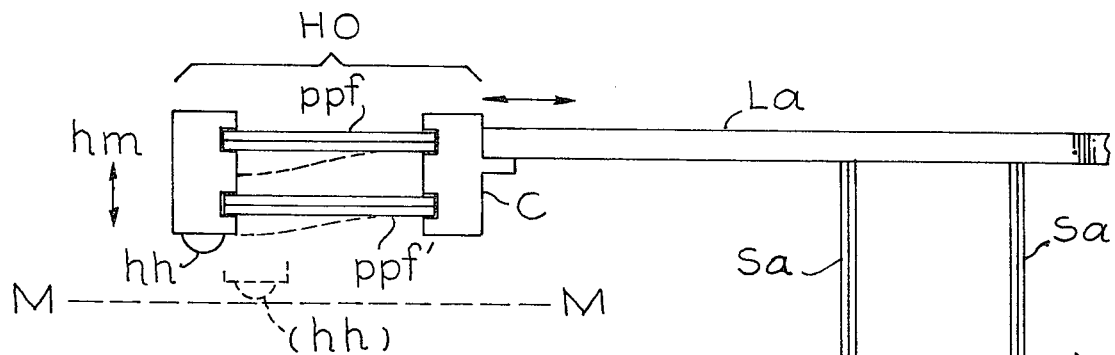
Fig. 10
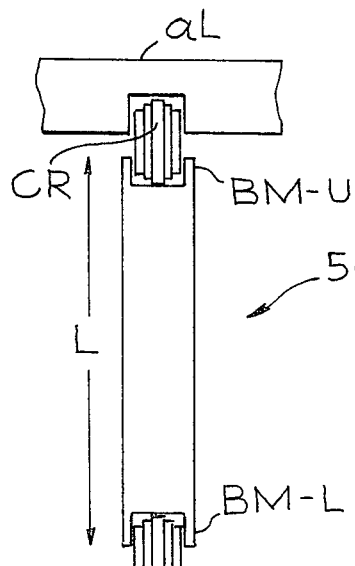
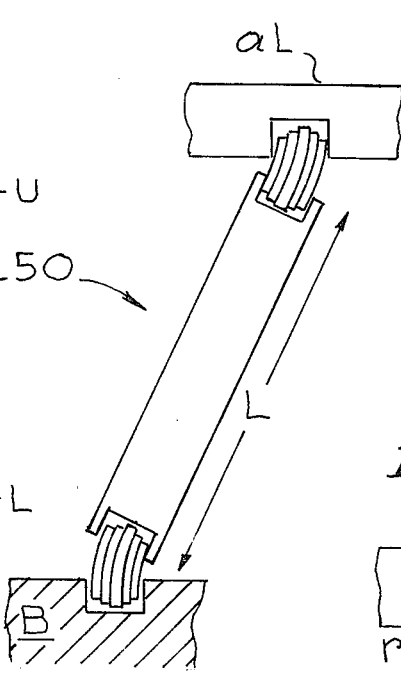
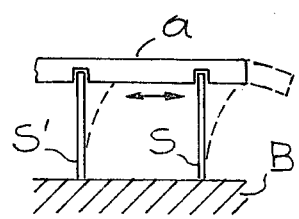
Fig. 11A    Fig. 11B    Fig. 12 (PRIOR ART)
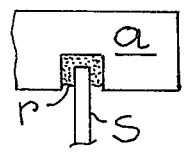
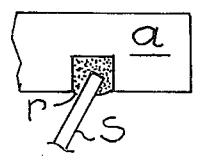
Fig. 12A    Fig. 12B

PIEZOELECTRIC TRANSDUCER MOUNTING STRUCTURE AND ASSOCIATED TECHNIQUES

CROSS REFERENCE TO RELATED APPLICATION

This is a continuation, of application Ser. No. 038,914, filed May 14, 1979 now abandoned, which is in turn a continuation of application Ser. No. 957,169, now U.S. Pat. No. 4,188,645 filed Nov. 2, 1978, entitled "Piezoelectric Servo For Disk Drive", by Herbert U. Ragle and Dean DeMoss, and commonly assigned with this case while being incorporated herein by reference to the extent relevant.

This invention relates to transducer mounting structures and associated techniques, and more particularly to such structures which employ a pair of piezoelectric flexures for mounting a transducer support arm.

BACKGROUND, FEATURES OF INVENTION

FIG. 12 indicates a prior art flexure mounting of a reciprocating load "a" upon thin, resilient flexure strips S, S' cantilevered-up from a rigid base B. One, or several, such strips have been so used. However, one problem arises when it is vitally important to maintain load reciprocation perfectly rectilinear, since the normal tendancy is to pivot around such flexures in something of an arc (as in phantom FIG. 12). One object of this invention is to provide improved means for so mounting loads for more rectilinear reciprocation. Another object is to provide pairs of flexure mounts which are "self-bending" and are self-controlled to execute "S-bend" flexing.

Another related problem has been "coupling" of the distal end of such a flexure to the load. For instance, if such flexure strips are simply rigidly bonded to the load, little, if any, bending is possible and any substantial, prolonged bending tends to distort the strips or rupture the strip-load bond, or both—as well as to accentuate the (often undesired) arcuate travel of the load. One conventional approach to improving this situation is to bond the flexure end to an elastomeric insert and secure this insert firmly to the load arm, as indicated for rubber insert r bonded to the end of steel flexure strip S in FIG. 12A. But this has drawbacks. For instance, such an insert tends to "part" from load arm "a" more as the flexure pivoting excursion increases—distorting the rubber and stressing it as indicated in FIG. 12B; and obviously tending to rupture or unseat the resilient coupling.

Another drawback with such resilient couplings is that they introduce a "pivot point" at their junction with the load; also they tend to "slip" in various directions and allow undesirable "skew motions" (e.g., lateral slip, forward pitch, yaw, etc.) of the load. This is absolutely unacceptable in many applications; e.g., where the load-arm carries a tiny magnetic recording transducer (such as indicated at "h" in FIG. 3 which is understood as to be moved across "medium-locus" M . . M by a load arm La supported for reciprocation on flexures pf, pf'). In such instances, the "skew motions" are not only antagonistic to accurate transducer positioning, but they also introduce non-linear drive/load coupling which upsets the servo system. That is, as the drive means reciprocates its load at relatively high gain (high frequency, large-excursion) and a damping feedback is experienced, it becomes virtually impossible for the servo system to maintain the desired transducer travel; also oscillation will likely result.

This invention is intended to provide improved flexure mountings alleviating such problems, especially as regards paired flexure mounts for magnetic transducers. That is, it is found, according to a feature hereof, that such flexure mounts may be advantageously provided in the form of resilient piezoelectric strips, or "pz-flexures".

Moreover, it is also found, according to a related feature, that such "pz-flexures" may be made, and controlled, to execute like "S-bends" when made in a prescribed "compound" configuration—whereby to better mount and guide such loads in more controlled, stable, rectilinear reciprocation. It is found that one may rigidly bond the driven end of such "pz-flexures" to a load-arm and drive the arm in such a manner (described below) that the flexures will both execute relatively smooth, low-stress "S-bends" as indicated schematically in FIG. 2. In an embodiment like that of FIG. 2, one can rigidly join a pair of "compound" piezoelectric flexure mounts (1, 1') to a load arm La, and—dispensing with the usual drive means—use such flexure mounts as a "motor" to reciprocate the load-arm "a" relatively rectilinearly. The while these pz-flexures will execute a smooth "S-bend" and will also serve as a relatively precise, convenient and advantageous reciprocator (drive) means for the load, while reducing problems with vibration and resonance. Such a pair of "compound pz-flexures" will also be seen to eliminate the usual troublesome "pivot point" mentioned above and will allow both ends of each flexure mount to be rigidly secured.

This invention will be seen as particularly apt with apparatus for establishing and maintaining the position of such transducers with respect to such recording tracks; and is particularly adapted for recording on magnetic tape, drum, and disk media, (especially with high density, high TPI recording). In such recording, a fast, non-magnetic, miniaturized, solid state translation means is particularly desired—especially where translation distances are relatively small (on the order of a few dozen microinches or more—e.g., typically over a total excursion of a few mils).

Workers in the art of magnetic recording at ultra-high densities are well aware of limitations in present-day transducer positioning apparatus, such as the typical voice coil actuator systems, or the like. Such systems are undesirably large, slow and unwieldly. They are particularly unsatisfactory for "centering" a transducer relative to a narrow recording track, where positioning is critical. Such systems are also troublesome in that they use solenoid magnets or other magnetic actuator means, creating stray magnetic fields that can interfere with the magnetic recording apparatus. The present invention is adapted to remedy these shortcomings with a solid state, piezoelectric flexure arrangement for mounting and positioning magnetic heads.

Thus, it is an object of this invention to provide the mentioned features and advantages. Another object is to provide improved "paired-piezo-flexure" mounts. Another object is to provide such mounts as particularly adapted for fine-positioning and centering a transducer relative to a recording surface. Yet another object is to provide such a supporting/positioning solid state structure comprised of one or more electrostrictive elements adapted to be deformed (elongated and bent) into a "S-bend" in accordance with a control voltage pattern applied thereto—preferably using one or more pairs of "compound" piezo-flexures, mounted in parallel and adapted to translate the supported load structure relatively rectilinearly.

BRIEF DESCRIPTION OF THE DRAWINGS

These and other features, objects and advantages of the present invention, will be better appreciated by workers as they become better understood through reference to the following detailed description of present preferred embodiments. This description should be considered in conjunction with the accompanying drawings wherein like reference symbols denote like elements:

FIG. 4A is a side elevation of "pz-flexure" embodiment, shown in section in FIG. 4B;

FIG. 5A is a more schematic side view of a like embodiment in one state, and FIG. 5B the same in another operating state;

FIG. 6A shows an alternate "thermo-flexure" embodiment, while 6B shows the same in operation;

FIG. 7A shows an alternate embodiment, while 7B and 7C illustrate respective operating states;

FIG. 8 shows a simpler version of the unit in FIG. 4B;

FIGS. 9 and 10 show modified embodiments over the like showing in FIG. 3;

FIG. 11A shows a modified embodiment over the like showing in FIG. 4B; while FIG. 11B shows the same in operation; and FIG. 12 is a prior art arrangement after the like showing in FIG. 2, with FIGS. 12A, 12B showing successively enlarged partial views thereof.

DESCRIPTION OF PREFERRED EMBODIMENTS

Figure 1:
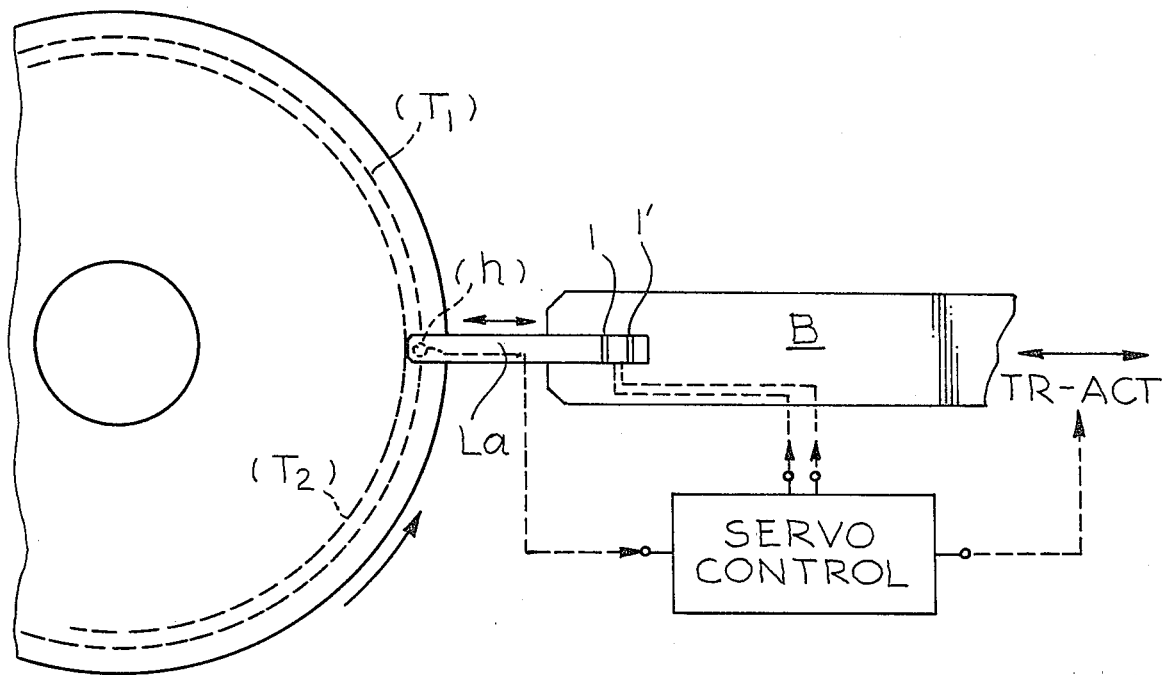
FIG. 1 is a schematic plan view of a recording head-arm, mounted for disk track-positioning on a piezo-flexure array according to a first embodiment; this being shown, in part and enlarged, in the partial side elevation of FIGS. 2 and 3.

FIG. 1 will be understood as depicting, in very schematic plan view, a typical magnetic recording arrangement wherein a transducer, or head h, is adapted for "fine positioning" (i.e., track-centering, etc.) and like head positioning between closely adjacent recording tracks $T_1$, $T_2$, etc., according to one embodiment of the invention. Here, and elsewhere throughout this description, it will be understood that the construction materials and operation of known indicated elements will be conventional, except as otherwise indicated.

Thus, disk D will be understood as a rotatable magnetic disk of known construction, disposed, as indicated, operatively adjacent magnetic head h. Disk D includes a number of relatively concentric magnetic recording tracks, $T_1$, $T_2$. Preferably, such tracks should be understood as relatively closely spaced (e.g., on the order of one milli-inch center to center), and preferably "abutting" in alternately-skewed "Herringbone" relationship, as known in the art, while being susceptible of "minute" centering translations (e.g., from ten to fifty micro inches).

Head h will be understood as suspended from the free end of a cantilever support, or head arm La. Arm La, in turn, is affixed at the free distal end of a servo platform B understood as reciprocated, rectilinearly as indicated by the arrow, by known means (e.g., a conventional voice coil, or lead screw arrangement as known in the art, and not indicated here) toward and away from disk D—but assumed rigid relative to moving arm La. This reciprocation can be controlled with conventional servo functions to translate head h between different tracks, or groups of tracks, on disk D (e.g., in coarse positioning), responsive to servo signals as known in the art.

Figure 2:
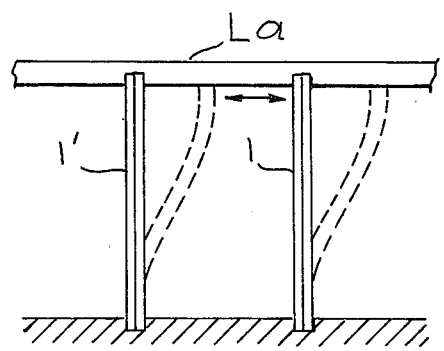

According to the invention, and as better indicated in FIG. 2, arm La is mounted on platform B on two or more "piezo-flexure" supports, 1, 1'. This flexure array will be understood as intended to maintain the recording face of head h relatively rectilinear and parallel to the recording surface on disk D. These supports are provided, and operated, according to the invention, to bend, as indicated in FIG. 2, and to be self-propelling upon being energized. Each flexure will be explained as an electrostrictive multi-part strip (see FIGS. 4) formed and constrained so as to bend a prescribed degree and translate arm La, and head h thereon, over a prescribed, relatively precise rectilinear excursion (here assumed to be the order of one to several dozen microinches, over a total excursion of one to several mils), responsive to application of prescribed electric voltage, as generally understood in the art.

Such an arrangement may, for instance, be adapted and controlled to automatically correct for track eccentricity, and other positional errors, establishing and maintaining a precise "track-centering" responsive to servo feedback (e.g., with centering signals fed-back from the media, as known in the art). Such control signals may, very conveniently, be applied as detailed below, to electrically activate these piezo-flexures and elongate and bend them for this purpose.

For instance, correcting signals may be derived from the data tracks themselves in a "track-on-data" mode, the servo-data being sensed by an associated control head and applied to "flexure control means" (not shown, but conventional), and processed there, so as to generate flexure activation signals. Such signals will be understood as adapted to produce a prescribed shift in head position, sufficient to effect the desired correction (by known associated electronic controls, not here detailed, but known in the art). Piezo-flexures 1, 1' will be understood as responding accordingly, being physically distorted to displace the head a corresponding prescribed straight-line distance in the direction of error reduction. As a feature of novelty, at least one pair of such like piezo-flexures will be used to induce this fairly rectilinear translation. Such "electrostrictive" materials are known to workers as adapted to elongate, or contract, in the desired direction, by a prescribed amount, when subjected to an associated electrostatic field, being constrained so as to generate a bending excursion as indicated.

Of course, the transducer head may otherwise be constructed, and may be operated relatively conventionally—for instance, being gimble-mounted and arranged to pivot about either of two perpendicular axes, while also adapted to "fly" on an intermediate (e.g., relatively "stiff") air film above the passing medium, while being held or biased downwardly theretoward, as well known in the art. (Though such conventional elements are not indicated or shown here).

"pz-flexures" in general:

Such elements are known in related arts for mounting like loads and are, at times, characterized as "bimorph mounts" or as piezoelectric ceramic bender plates— e.g., such as those manufactured by Vernitron Corp. or by Gulton Industries; (see also U.S. Pat. No. 4,099,211 to Hathaway, as well as related art cited therein). Such "bimorphs" may be understood as typically composed of two piezoelectric ceramic strips securely bonded on opposite sides of a central electrode core and sandwiched between a pair of outer electrode plates. These ceramic strips will be understood as formed to have respective "polarizations" (direction) which are either "identical", or "opposed", depending upon how the electrodes are to be energized.

Such a "bimorph" is schematically indicated in FIG. 8 wherein piezoelectric strips 11, 13, may be understood as bonded to central metal core 15 with their outer surfaces contacted by respective planar electrodes 19, 17, to form bimorph 10.

That is, a pair of piezoelectric slabs, or "beams", are laminated together and bonded about an intermediate energizing plate, and being also sandwiched between a pair of outer energizing plates. Thus, application of a prescribed voltage across these plates (electrodes) will be understood as causing the beams to execute the indicated bending, pivoting excursion of prescribed magnitude. As workers know, flexure depends upon the choice of piezoelectric materials and electric voltage (for a head load, etc., of prescribed mass), and the mounting. That is, application of a prescribed current can cause one of the beams to elongate and the other beam, to compress, thereby developing the prescribed conjunctive pivoting excursion (since the beams are held together).

The dimensions and proportions of such a bimorph (or pz-flexure) 10 will be understood as tailored to the particular application and performance desired. Such bimorphs are available commercially and may be obtained in various standard thicknesses to be cut to a desired length and width. The dimensions and proportions will be set according to the desired displacement sensitivity, range and response; as well as the desired resonant frequency, and the desired bending curve and associated structural rigidity. For instance, the length/width aspect ratio can be determined to restrain the flexure from "slippage" along its width direction and/or from torsional skew (i.e., twisting about its length/width plane).

Bimorph thickness can be selected to provide good sensitivity (that is, displacement per unit of drive voltage), as well as to determine resonant frequency. Thickness is preferably sufficient to permit the element to be vibrated at a prescribed maximum frequency which is well below the resonant frequency. Also, thickness is such as will set a practical voltage (limit) for the desired maximum displacement rate and range. For instance, certain available bimorphs will execute an excursion on the order of ±0.02 cm. at about 200 cps where their thickness is about 3% of their width. Of course, reducing thickness will increase sensitivity, while lowering the resonant frequency. Thickness uniformity should be such as to bar unacceptable twisting.

Now, as indicated in FIG. 8, such a bimorph 10 may be used for bi-directional deflection, being understood as rigidly fixed to a prescribed rigid base B-1 and cantilevered out so that its free, distal end may be flexed back and forth, such as into the "up" and "down" positions shown in phantom in FIG. 8. Deflection will occur in response to a certain applied voltage. The direction of deflection will depend on the polarity of the applied voltage and upon the "flexing direction" (and polarization) of the piezo-ceramic plates used. This flexing direction is established by subjection of the ceramic to a certain polarizing field so as to exhibit certain mechanical and flexing properties when (later) subjected to a prescribed "flexing voltage". Thus, bimorph 10 may be understood as bent toward one or the other of ceramic plates 11, 13 according to the predominant (or net) polarity of the applied voltage. For example, a certain deflection voltage ($+V_d$) may be understood as applied to one such ceramic plate to bend it "up", while opposite polarity voltage ($-V_d$) applied to the other ceramic plate causes it to bend "down". Thus, for bimorph 10, it might be understood that with +50 volts applied across plate 13 and zero (0) volts across plate 11, plate 13 will be induced to bend "down", carrying the whole structure into the "down" position as indicated. Contrariwise, with zero (0) volts applied across plate 13 and +50 volts applied across plate 11, plate 11 will be induced to bend "up" and carry the structure into the indicated "up" direction (phantom). Preferably, +50 volts is applied to plate 13 while −50 volts is applied to plate 11 so that both plates bend, conjunctively, up and down together. The activation power must, of course, be controlled (e.g., not exceed breakdown voltage, or depolarize or rupture the crystal).

Compound pz-flexure:

According to a salient feature hereof, it is found preferable to form such piezo-flexure strips in the form of prescribed "compound" structures ("compound bimorphs") as indicated schematically, at 40 in FIGS. 4A and 4B, to execute the desired "S-bend" during flexing (e.g., as in FIG. 2). Here, the "compound" (bimorph) pz-flexure 40 will be understood as comprised of a pair of piezo-ceramic plates 43, 45, bonded to an intermediate conductive substrate 41, such as a brass plate. However, here, each ceramic plate 43, 45 is contacted by two (rather than one) exterior electrode conductors, such as independent conductor plates 47a, 47b, bonded on the outer surface of plate 45 and like conductors 49a, 49b on the outer surface of plate 43. Conductors 47, 49 may comprise a conductive planar coating of silver nickel or the like, with respective connections to a source of driving voltage; while the rest of the bimorph 40 may be understood as otherwise arranged and constructed relatively conventionally such as described in my prior application or in the cited art.

Operation, use:

Exemplary operation may generally be understood by the simplified showing in FIGS. 5A and 5B described as follows.

In FIG. 5A, the "compound" pz-flexure 40 will be understood as executing a prescribed ("positive") "S-bend" according to this feature, upon application of the indicated voltage-polarity pattern. That is, for example, with a positive voltage applied to plates 49a and 47b (making parts of 43,45 bend into convex curves) and a suitable negative voltage applied to plates 49b and 47a (making them bend "concavely"), the desired "S-bend" may be understood as executed as illustrated (in the "positive" sense). Similarly, in FIG. 5B a like, but oppositely directed (or "negative"), S-bend is to be understood as executed simply upon application of the opposite voltage pattern.

The flexing of the laminated piezo beams must be constrained, as indicated to induce such "S-bending"; that is, given the concurrent elongation/contraction of the bimorph crystals, they will be understood as bonded together (both to the conductor core 41) securely enough to maintain their contact with no relative movement under the prescribed elongation and bending moments—suitable, known adhesive being used to hold their faces joined to the intermediate electrode to provide this constraint. Such a piezo crystal laminate flexure may be characterized as having the two crystals in "opposed" electrostatic relationship. As workers know, such strips are, typically, high voltage, high impedance devices. Care should be taken to provide against "creep" resulting from di-electric "relaxation" (e.g., a "set" can be avoided by assuring bi-directional bending in the usual operations).

One may use a "bimorph" piezo-flexure—Trade designation, designation as sold by Vernitron Piezoelectric Company, Bedford, Ohio, or a like unit sold by Gulton Industries, Fullerton, Calif., and ±several hundred volts across such slabs has been observed to produce excursions of ±one to ten mils, carrying a head load of approximately ten −200 grams, etc. Response in the "hundred Hz" range is feasible too.

Figure 3:
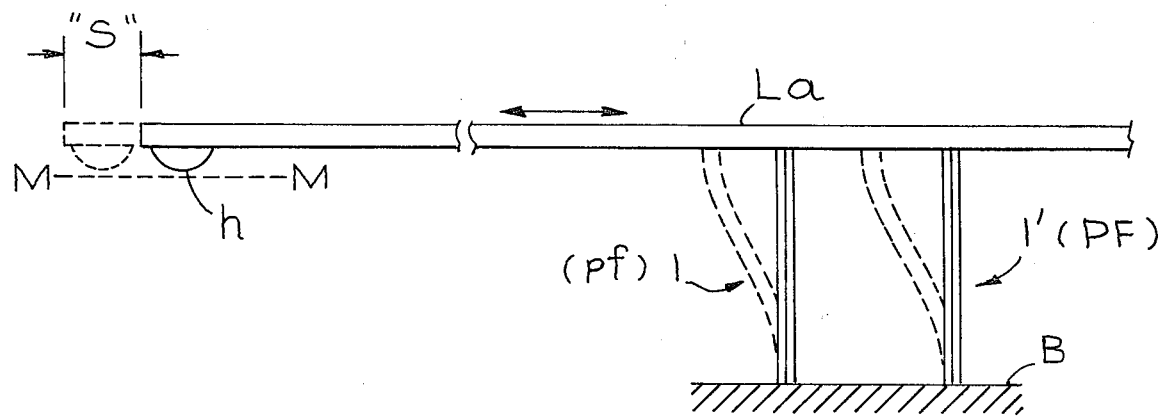

Application of such a pair of "compound" pz-flexures is indicated in a preferred embodiment in FIG. 3. Here, pz-flexures pf, pf' will be understood as functionally the same as (compound) pz-flexures 40 above, being used and adapted to mount a head arm La for reciprocating a transducer head h relative to a recording medium (see record plane M . . . M; e.g., magnetic disk recording surface). The pair of compound piezo-flexures will be understood as arranged and controlled here to provide "fine positioning" reciprocation of this head h as known in the art.

Briefly, it will be understood that when it is sensed that the desired registration between such a transducer h and a "selected" disk track is lacking, an electrical correction signal pattern may be applied to (all parts of) the compound piezo-flexures pf, pf'—this signal pattern being understood as causing flexures pf, pf' to translate the head arm so as to shift the transducer gap into better registration (toward "track center") and thus reduce tracking error as known in the art.

Comparison with Hathaway Patent; U.S. Pat. No. 4,099,211:

As mentioned above, Hathaway patent U.S. No. 4,099,211 is helpful to consider as a means of highlighting some of the subject features. This patent does not teach the mounting of a head arm, or any like load, on a pair of piezoelectric flexures (whether "compound" bimorphs or not). Rather, it indicates a different arrangement wherein the transducer mounting arm, it self, comprises a brimorph, and is adapted to be bent so as to sweep a transducer (gap) back and forth across recording tracks. Such an arrangement is indicated in FIG. 9 where bimorph bm is affixed on the distal end of arm Laa (supported on steel flexure springs SS, SS') and is adapted to present transducer head ha in operative relation with magnetic media (along locus M' . . . M'). Application of a proper voltage pattern ($V_A$, $V_B$ to outer plates and $V_g$ to core) will cause bimorph bm to bend (e.g., see phantom position of head ha).

Of course, one difficulty with such an arrangement, as opposed to that indicated in FIGS. 3–5, is that, during such a bending excursion, the head-to-record distance is necessarily going to very—especially at the bending extremes. As workers know this leads to decreased signal coupling, or "zenith error". Also, it has been found that such a head arm (Laa) may introduce "azimuth errors", with the transducer gap being angularly displaced or (skewed) from its normal transverse orientation relative to track-length—unless extraordinary care is taken in mounting such a bimorph appendage bm. The teaching of this patent attempts to improve the orientation and azimuth of such a head relative to its track.

One Hathaway structure involves a bimorph about 2.4 cm long by about 1.27 cm. wide and about 0.05 cm. thick, and is intended to give a deflection of ±0.024 cm. This structure had a resonant frequency of about 400 cps, while being operated up to about 200 cps typically and represented 1.5 grams total weight, while carrying a head weighing about 100 milligrams.

In a second related embodiment Hathaway also features a deflectable read transducer assembly of like kind with added means for sensing vibrations induced in his head arm (bm). (See FIG. 12 of Hathaway, for example). Hathaway indicates that his bimorph mounting arm (e.g., bm, FIG. 9) is capable of being controllably deflected while simultaneously generating an output signal which represents the controlled arm-deflection, or a similar deflection, (e.g., vibration-induced; might be used with video tape recorder system).

Compared to the Hathaway structures there are many differences in the subject embodiments, for instance, those indicated in FIGS. 3-5 and as follows.

Firstly, Hathaway, as mentioned teaches use of a bimorph only as a head-mounting arm—not as a pair of flexures mounting such an arm.

Moreover, Hathaway is not concerned with "paired" flexures, or any such flexures so adapted to reciprocate such a mounting arm and so avoids the cited problems of loose coupling (rubber mounts or the like). Symptomatic is the showing in FIG. 25 of Hathaway wherefrom it becomes apparent that the only reason for his adding a second pair of opposing piezoelectric plates is to compensate for the "out of plane" bending of the free end of his mounting arm—thus attempting to keep this end oriented so that the head gap is kept more parallel with the plane of the medium.

Similarly, relative to his FIG. 21A, Hathaway describes features for compensating for skew or roll of his bimorph mounting arm—whereas with the invention the bimorph-flexure mounts are mounted rigidly in parallel so as to be inherently free of any such skew, roll or twisting.

Similarly, the Hathaway structure is subject to spurious sidewise-loading—so much so that Hathaway teaches compensatory means, such as the dynamic sensing and de-twisting manipulation of the bimorph to compensate for such loading. Such sidewise loading is of no concern in the use of paired piezo-flexure mounts as with the invention; such mounts are not subject to any problems from sidewise loading.

Other differences are also apparent. Mounting piezo flexures in tandem as pivot mounts is not only inherently more stable under flexing (vs. what Hathaway teaches), but can support a much heavier load and develop much greater forces (e.g., to reciprocate the mounting arm faster).

Moreover, any number of such "pz-flexure" pairs may be used for increased power and/or increased stability and rigidity where desired.

FIG. 10 shows a further modification of the arrangement in FIG. 9, wherein a transducer head (hh) is supported on a mounting (hm), by a pair of pz-flexures ppf, ppf', cantilevered out on a coupling C from an end of an arm La (which, itself, may be reciprocated as before described); for reciprocation toward and away from a recording plane M . . . M. That is, this array HO, will be understood as functioning to change the "head-tomedia" spacing as known in the art—doing so simply by activating flexures ppf, ppf' as above described—and doing so while maintaining the head face more parallel to plane M . . . M, with less twist, skew, etc., (see phantom head position hh and phantom flexure orientation; attitude of hh unchanged).

Modifications of Embodiment:

Some modifications within this concept are possible for the embodiments of FIGS. 3-5, as workers will perceive. For increased (reciprocation) power, one may increase the area and/or the thickness of each pz-flexure. However, added thickness will increase the stress on a piezo strip, as well as increasing its stiffness. Increasing sensitivity will increase bending excursion, but one must be careful not to so-bend it beyond its limit as to degrade the piezoelectric qualities.

With the Hathaway structure, one has less freedom to increase width since he may possibly introduce bending distortion since the bimorph itself serves as a head mount arm. By comparison with the invention, one may relatively freely increase piezo-strip width—and even stack them side-by-side—without such concern; especially because they are inherently non-skewing and non-twisting. Also, one may increase piezo-strip length with much more freedom because of the multiple mounting constraints and inherent stability of the "paired pz-flexure" configuration. Thus, one might so enlarge such pz-flexure pairs and drive them at relatively low power to make it less likely that they exceed their excursion limits and be permanently deformed.

Related Embodiments; FIGS. 6, 7:

FIG. 11A shows a variation of the "pz-flexure" concept wherein an elongated pz-flexure 50 is, in effect, extended along a relatively rigid center section CR intermediate the terminal piezo-flexure arrays BM-L, BM-U—each such array being understood as comprising a "pz-flexure" as above described (e.g., re FIG. 8) and assumed as optimally operated when paired with another like elongated pz-flexure (not shown) to support a load (aL) pivotingly from a rigid base B. The intermediate rod CR may comprise any suitable length L. Thus, when the pz-flexures are activated by the proper voltage pattern they may be oppositely bent, (e.g., as in FIG. 11B) to effect the mentioned "S-bend" flexing, while they are driving load aL pivotingly so it is translated relatively rectilinearly.

FIG. 6A indicates a similar "compound-bending-flexure" 20; however one that is responsive to heat rather than to voltage. That is, "thermo-flexure" 20 comprises a pair of heat-bending strips 23, 25 (e.g., a copper alloy) bonded to a central relatively rigid core 21 (e.g., of steel). Strips 23, 25 will be understood as having relatively high thermal expansivity (coefficient of thermal expansion)—such that under a prescribed thermal regime, the heat-bending flexure 20 will execute a "S-bend" and will pivot to translate a load $L_h$ relatively rectilinearly as seen in FIG. 6B (assume 20 is paired with a like flexure pivot).

FIG. 7A shows a like "compound-bending-flexure" 30 that may operate similarly when subjected to a prescribed electric field E. That is, flexure 30 may comprise a pair of magnetostrictive strips 33, 35 (e.g., a thin film of Permalloy that will elongate under a prescribed field E) bonded to a relatively rigid core 31 (e.g., of brass) which will not so elongate. It will be understood that upon application of a prescribed field (see vertical field $E_v$), this "magnetostrictive-bending-compound-flexure" 30 will execute a similar "S-bend" (FIG. 7B; especially when paired with a like flexure) and can similarly reciprocate a load relatively rectilinearly. In certain instances, a different driving field (see horizontal field $E_h$ transverse to the vertical field $E_v$) may be applied to reverse the S-bending sense as in FIG. 7C.

Conclusion:

Workers will recognize alternate uses and applications of the invention. For instance, structures according to this invention will be understood by those skilled in the art as useful in many types of mounting configurations, such as mounting arms associated with magnetic recording structures—as, for instance, those used in recording on magnetic drums or on magnetic tape (e.g., tape recording as used with digital computers, or in audio or instrumentation recording; or with rotating heads, such as for broadband data recording and/or video signal recording).

Further modifications of the invention are also possible. For example, the means and methods disclosed herein are also applicable for providing the positioning required in other forms of recording and/or reproducing systems, such as those in which data is recorded and reproduced optically; and/or with other related head support/translation arrangements.

The above examples of possible variations of the present invention are merely illustrative. Accordingly, the present invention is to be considered as including all possible modifications and variations coming within the scope of the invention as defined by the appended claims.

What is claimed is:

1. An actuator unit mounted on prescribed actuator means including a transducer means at the free end thereof adapted to reciprocate elongate load means along a prescribed rectilinear path, being supported on at least two parallel flexure means, each flexure means comprising an elongate, composite multi-element beam;

each such beam being comprised of a center section flanked, at a first end, by a first bending section and associated first bending means adapted to bend this first section in a first direction relatively along said path; and also flanked at a second, opposite, end by a second bending section and associated second bending means adapted to bend this second section in a second direction, opposite said first direction, said first and second bending means being adapted to each execute a compound "s-bend", whereby said elongate load means is so thrust along said rectilinear path as to minimize azimuth dislocation of the transducer means.

2. A multi-piezo actuator unit comprising a prescribed elongate load structure adapted to be reciprocated along a prescribed relatively rectilinear path relative to a prescribed relatively fixed base means; and at least two parallel elongate piezoelectric flexure means, each mounted from said base means at one end and coupled to the load structure at the other end, with each said flexure means being arranged and adapted to be excited and bent in a prescribed re-entrant-S-configuration by an associated voltage pattern, the base means being mounted on a prescribed linear actuator means, whereby said elongate load structure is reciprocated in a manner to minimize azimuth dislocation of the load associated with said elongate load structure.

3. The combination as recited in claim 2 wherein each said flexure means comprises a pair of like elongate piezo-ceramic plates bonded along facing sides to intermediate conductive substrate means, each said plate having a pair of outer electrode means coupled thereto so that, upon appropriate conjunctive excitation of said electrode means, the two flexure means will conjunctively execute like S-bends to thereby controllably translate said load structure.

4. The combination as recited in claim 2 wherein each said flexure means is so formed into a "compound piezo-flexure"; including opposed elongate electrode means adjacent each end of the flexure means, being adapted to be so excited by an associated voltage pattern as to execute the prescribed "S-bend flexing" whereby to controllably translate said load structure.

5. The combination as recited in claim 4 wherein the load structure carries magnetic recording transducer means thus adapted for translation relative to an associated recording disk.

6. An actuator unit comprising load means cantilevered out upon elongate arm means, supported by a plurality of self-flexing flexure means, each flexing means being relatively rigidly attached to the arm means and to its associated relatively fixed base means in a parallel array, while being electrically connected to respective electrical charge means whereby the flexure means are adapted to conjunctively execute S-bend flexure, flexing in common so as to controllably reciprocate said arm means and load means rectilinearly along a prescribed excursion distance;

each said flexure means comprising elongate multi-element beam means, this beam means being comprised of a center section flanked at a first end by a first bending section and an associated first bending means adapted to bend this first section in a first direction;

this beam means also including a second bending section at the end thereof opposite said first bending section together with an associated second bending means adapted to bend this second section in a second direction relatively opposite said first direction, whereby the load means cantilevered out on said elongate arm means is controllably reciprocated in a manner to minimize azimuth dislocation of said load means.

7. The unit as recited in claim 6 wherein the flexure means comprises piezo-electric flexure means.

8. The unit as recited in claim 7 wherein the load means includes magnetic recording means.

9. A magnetic recording arrangement including a mounting servo arm, a transducer head adapted to be carried by the servo arm so as to be translated into transducing position across a prescribed recording locus, this locus lying operatively adjacent the plane of passing magnetic recording surfaces and relatively parallel thereto for transducing interaction thereof with said head; the improvement therewith comprising:

a pair of opposed parallel "compound-piezo-flexure" means arranged and adapted to pivot said servo arm and effect said head translation;

each flexure means comprising a pair of flexible piezoelectric strips bonded together about an intermediate core electrode and including two pairs of opposed outer electrode plates, one plate pair at each end of the given strip pair; said flexure means being adapted to be electrostrictively energized and distorted upon application of prescribed signal voltages to said plate electrodes, with the strips being constrained so as to execute a prescribed "S-bend" pivot excursion according to the applied voltage, and so translate said arm and the head thereon relatively rectilinearly, whereby said transducer head carried on sand servo arm is so translated along the prescribed recording locus as to minimize azimuth dislocatin of the transducer head.

* * * * *

UNITED STATES PATENT AND TRADEMARK OFFICE
CERTIFICATE OF CORRECTION

PATENT NO. : 4,374,402

DATED : February 15, 1983

INVENTOR(S) : Herbert U. Ragle, Norman S. Blessum & Dean DeMoss

It is certified that error appears in the above—identified patent and that said Letters Patent is hereby corrected as shown below:

Col. 7, line 48, change "brimorph," to --bimorph,--.
      line 61, change "very" to --vary--.

Signed and Sealed this

Thirty-first Day of May 1983

[SEAL]

Attest:

DONALD J. QUIGG

Attesting Officer                Acting Commissioner of Patents and Trademarks